J. M. CLARK.
Flouring Mill.
No. 18,574.
2 Sheets—Sheet 1.
Patented Nov. 10, 1857.
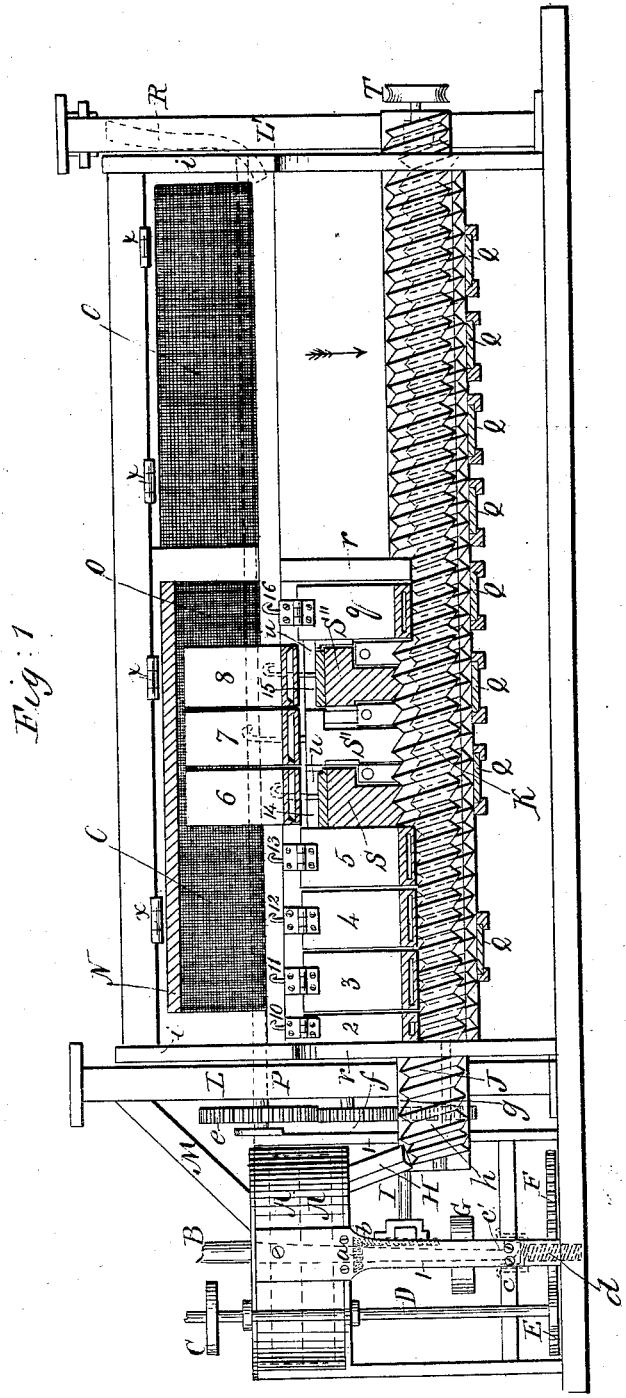

J. M. CLARK.
Flouring Mill.
No. 18,574.
2 Sheets—Sheet 2.
Patented Nov. 10, 1857.
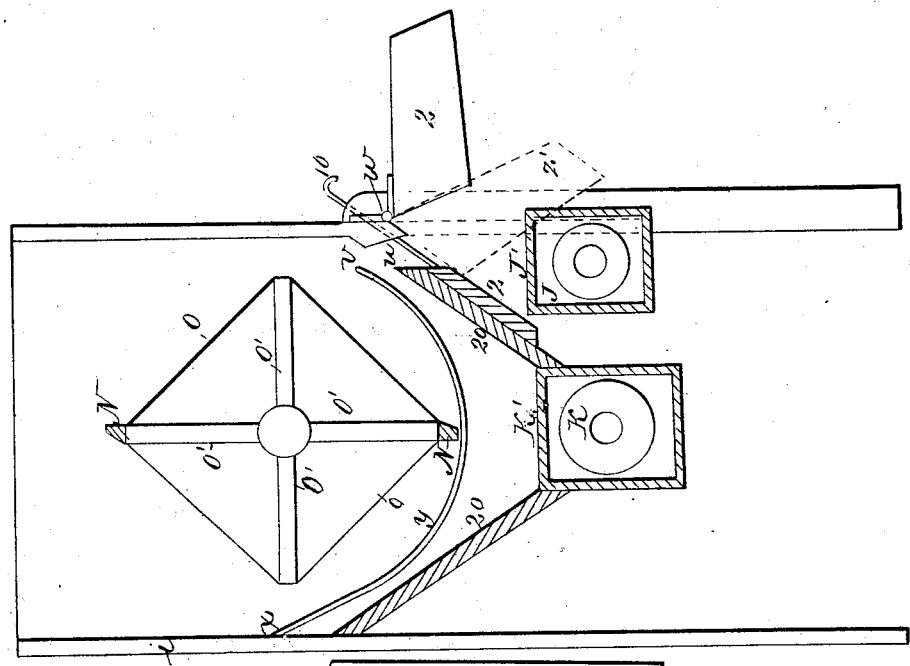
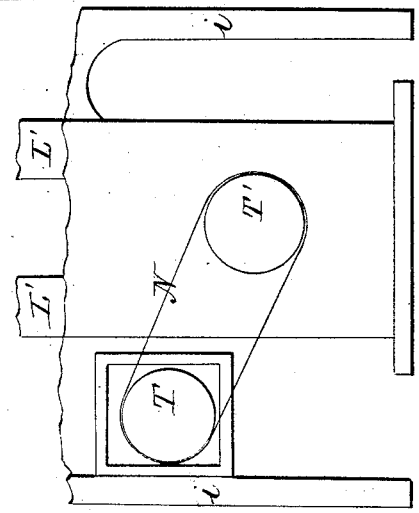

UNITED STATES PATENT OFFICE.

JAMES M. CLARK, OF LANCASTER, PENNSYLVANIA.

DISTRIBUTING APPARATUS OF FLOURING-MILLS.

Specification of Letters Patent No. 18,574, dated November 10, 1857.

*To all whom it may concern:*

Be it known that I, JAMES M. CLARK, of Clark's Villa, Lancaster city, and State of Pennsylvania, have invented certain new and useful Improvements in Merchant Flouring-Mills; and I do hereby declare that the following is a full, clear, and exact description of the same, reference being had to the accompanying drawings and to the letters of reference marked thereon.

The nature of my invention consists in the employment of the movable and adjustable spout or series of movable and adjustable spouts and also in the arrangement of these with certain other devices the peculiarities of which will be hereinafter fully described.

In order that others skilled in the arts may manufacture and use my invention I will proceed to describe its construction and operation.

In the accompanying drawings which make a part of this specification. Figure 1 is a side elevation showing a grinding mill attached. Fig. 2 is an end view showing the internal arrangement and a portion of the external. Fig. 3 is an end view showing the connection of the conveyers.

In Fig. 1 I show an ordinary grinding mill and its connection with the bolting chest, reel elevators, conveyers and their attachments. H, is the spout leading from the stones to the conveyer J. I, is a shaft which conveys power from the mill and gives motion to the machinery within the bolting chest. M, is a spout by means of which any part of the material, after being ground may be returned to the eye of the stones after having been passed through the bolt. *i i*, are the two heads of the machine. O, represents the bolting cloth and reel. N, is a scraper attached to the bolting reel for the purpose of scraping up the flour to a desired point from the circular bottom after it has passed through the bolting cloth. J, is a conveyer, and case, through which the ground material passes after coming from the stones, said conveyer J conducting the flour back toward the elevators L'. L' are elevators which conduct the material into the spout marked R. R, is a spout which connects the elevators L', to the bolting reel O, and through which the flour passes. K, is a conveyer which conducts any portion of the ground material which may require regrinding into elevators, L, said L, raising it to spout M, and then depositing it in the eye of the stones. 2 3 4 5 6 7 8 9 are a series of movable and adjustable spouts. S S' S'' are a series of slide valves. 14, 15, are rods serving to operate the valves S S'', 10, 11, 12, 13, 16, being like rods to operate similar valves. U, U, are apertures which the slides S S'' are intended to close when desirable. The slides operated by means of the rods 10, 11, 12, 13, 16, close or open similar apertures as may be desired in the operation of making flour. S', represents its corresponding aperture closed. Q, Q, Q, Q, Q, Q, Q, Q are slides which close or open corresponding apertures in the bottom of the conveyer case, in which conveyer, K, is operated.

In Fig. 2, *i, i*, are the frame. O' O' O' O', represent the arms of the bolting reel. O O, is the cloth on said reel. N, N, are scrapers, or drags, attached to the rib on the outside of the cloth of the reel, as seen in Fig. 1. Y, represents a circular division immediately under the bolting reel and extending along and beneath the reel from the point *r*, at the end of the chest, to division *v*, near the center of it as seen in Fig. 1, said circular division Y, being closely attached to one side of the bolting chest, the whole distance from *r* to *r*, Fig. 1, on one side, while the other side not touching the side of the chest, leaves an aperture *v* through which the flour passes in the direction the operator may desire. 20, 20, are the inclined sides of the bolting chest which connect with the conveyer case K', the entire length of the chest *u*, is an aperture in one of the inclined sides of the bolting chest, which extends the distance from *v* to *v*, seen in Fig. 1. 21, is a slide valve which is operated by means of the rod 10, and which serves to open or close the aperture U, as may be required by the operator. 2, is a movable or adjustable spout which is attached to the side of the bolting chest at *w*, being one of the series seen in Fig. 1, said spout 2 being elevated. 2' is the same spout seen in a different position. K', is a conveyer case in which conveyer K, is operated. K, is the conveyer which carries the ground material toward the stones again, either permitting it to pass out through the slides to Q Q Q Q Q Q Q Q Q into receptacles for it, or carrying it into the elevators L, and by means of spout M, into the eye of the stones. J', is a conveyer case inclosing conveyer, J, and serves to carry the material from the stones A A and spout H, into elevators L' and through spout R into the reel.

In Fig. 3 *i i* is the frame. L', are the elevators seen in Fig. 1, and marked the same. T is a pulley on the shaft of conveyer J, seen in Figs. 1 and 2. T' is a pulley on the shaft of conveyer K, said pulleys being connected by a band marked Z.

In the operation of this machine, the material is ground by means of the stones A, A, and then passes into spout, H, through spout, H, into conveyer, J, along conveyer, J, into elevators, L', up elevators L', into spout R, and down spout, R, into the center of the bolting reel, where it is bolted. As the material is bolted, the double extra, the extra, and superfine flour passes through the bolt and down the inclined sides 20, 20, seen in Fig. 2, in the direction seen by the arrow in Fig. 1, falls into conveyer case K' and is carried out of the slides Q Q Q Q at the head of the bolt, by means of the conveyer K, or if these slides are closed it is carried along to elevators L and then back to the stones again. As the inferior material passes down from the head of the bolt and arrives at that portion of the bolt immediately over the spout 9, the cloth being coarser here, a portion of it passes through the bolt and falls upon the circular division Y, seen in Fig. 2. All the material from that point as it passes toward the end of the bolt, falls upon this circular division, and is scraped up by means of the scrapers N, N, on the reel, to the aperture *v*, seen in Fig. 2, and falls down through this aperture. The material as it falls through aperture V, may take various directions, as may be desired by the operator. If the slide 21, closes the aperture U, the material will fall down the inclined sides marked 20, and pass into the conveyer case K', and be carried out of the slides marked Q Q Q Q, or any one of them, immediately under these apertures, if they are open, or if they are shut it is carried into the elevators L and spout M, and returned to the stones to be reground.

If slide 21 is down and aperture U is open and the movable and adjustable spouts are in the position seen at, 2, Fig. 2, the aperture U being directly under aperture, V, the material falls into this aperture U, and thence down into conveyer case J' and is carried by conveyer, J, toward elevators L', up elevators L' and down spout R into the reel again for rebolting and refining. If aperture U is open and the spout assumes the position seen by 2', in dotted line, the material passes out through this spout into receptacles outside of the bolt for use. As the material which passes through that part of the bolt immediately over the adjustable spout 2, seen in Figs. 1 and 2, is susceptible of these different operations, it will be readily seen that all the material falling upon the circular division Y, between the points 2, 2, Fig. 1, will be susceptible of the same changes by means of the spouts and valves arranged between these two points. It will be seen that when that portion of the bolt between the points 2, 2, is divided and arranged, in the manner herein set forth by means of the movable slides S S' S'' and the movable and adjustable spouts 2 3 4 5 6 7 8 9, that any and every portion of the bolt between these two points is under the control of the operator. These slides and spouts may be made only six inches wide or wider or narrower, but when six inches wide it will be seen that that portion of the ground material passing through the bolt, immediately over this portion may be separated entirely from any other qualities in the bolt and be drawn off or returned to the bolt, and rebolted, thus extracting all the extra superfine flour from it.

If in a space of two feet in my bolt I am making fine flour and I have my movable slides and movable and adjustable spouts in every six inches of space I can at my option draw off the finest of this fine flour, or I may return it to the bolt, to be converted into extra superfine, or I may let it pass back the stones again for regrinding. I can return the best and reject the worst or I can return the worst of the fine flour and take out the best, as may be desired. Thus it will be seen that with every six inches or less of bolt between the points 2, 2, according as it is divided, I can make various changes as may be desired, performing any of these operations, with any portion of the material and omitting any other portion which I wish. I can return all or any portion to the eye of the stones for regrinding before bolting the second time or all or any portion to the bolt for rebolting without being reground, or I can separate any portion which I may wish to regrind and return it to the stones and rebolt any portion without being reground, or take any portion of either and regrind or rebolt them as the case may require for the purpose of making a large yield of flour, and of a good quality.

I do not wish to be understood to claim a double series of spouts and valves, as that has been done before. But What I do claim as new and desire to secure by Letters Patent is—

1. I claim the adjustable or hinged spout or series of adjustable or hinged spouts as herein described for the purpose of rejecting, mixing, separating, rebolting or re-grinding and rebolting, any portion of the lower grades of flour, as herein set forth.

2. I claim the combination of the adjustable or hinged spout, or series of adjustable or hinged spouts, with a single series of slide valves, or valve, the circular division, Y, the conveyer J, and scrapers N, as set forth.

JAMES M. CLARK.

Witnesses:
C. M. ALEXANDER,
F. S. MYERS.